March 28, 1961  F. M. RYCK  2,977,141
CONNECTOR FOR WINDSHIELD WIPER BLADE
Filed Sept. 24, 1956

*INVENTOR.*

BY FRANCIS M. RYCK

*J. H. Strickland*
His Attorney

United States Patent Office 2,977,141
Patented Mar. 28, 1961

2,977,141

CONNECTOR FOR WINDSHIELD WIPER BLADE

Francis M. Ryck, Rochester, N.Y., assignor to General Motors Corporation, Detroit, Mich., a corporation of Delaware Filed Sept. 24, 1956, Ser. No. 611,435

4 Claims. (Cl. 287—20)

This invention relates to windshield wiper apparatus, and particularly to a connector on a wiper blade for attachment to a wiper arm.

Heretofore, numerous difficulties in windshield cleaning apparatus have been attributed to twisting of the wiper arm, and disengagement of the wiper arm and wiper blade due to the forces imposed on the connection during windshield wiping. This invention relates to an improved quick detachable blade to arm connection, specifically designed for use with an arm of substantially rectangular cross section. However, an arm of this type is disclosed only by way of example and is not to be construed as in limitation. The connector means of this invention prevents the latch from opening, thereby separating the blade and arm due to wiping forces. Accordingly, among my objects are the provision of an improved connector for detachable connection to a wiper arm; a further provision of a blade-to-arm connector including means preventing opening of the latch due to force imposed on such connector during wiper operation; and a still further provision of a blade-to-arm connector including means preventing tilting of the arm relative to the connector.

The aforementioned and other objects are accomplished in the present invention by incorporating a novel pin and slot connection between an arm and a blade. Specifically, as alluded to hereinbefore, the wiper arm for which the connector of this invention is specifically designed is substantially rectangular in cross section. Thus, the wiper arm possesses sufficient structural integrity to withstand the twisting forces imposed thereon during wiper operation. The outer end of the arm has mounted therein a transversely extending pin. The connector comprises an inverted channel member having a closed outer end and an open inner end. The side walls of the channel member are formed with diagonally extending slots which terminate in slots having closed ends which are located parallel to the plane of the wiper blade holder of the pressure distributing linkage assembly. The wiper blade may be of any conventional flexible design, thus including a pressure distributing linkage comprising a holder and one or more secondary pressure distributing members which are connected at longitudinally spaced points to a flexible backing strip of the squeegee unit.

The connector also includes a latch which is pivotally mounted on the channel-shaped member. The latch includes a furcated portion which is pivotally connected to the channel-shaped member, and also includes a channel-shaped portion having resilient ears depending therefrom. After the wiper arm is inserted into the slots of the side walls of the channel-shaped connector, the latch member is pivoted downwardly so that the ears thereof snap under the edges of the socket so as to permanently retain the arm connected to the blade. However, the wiper arm can be readily detached from the blade by manually disengaging the latch member.

Further objects and advantages of the present invention will be apparent from the following description, reference being had to the accompanying drawings, wherein a preferred form of the present invention is clearly shown.

Figure 3:
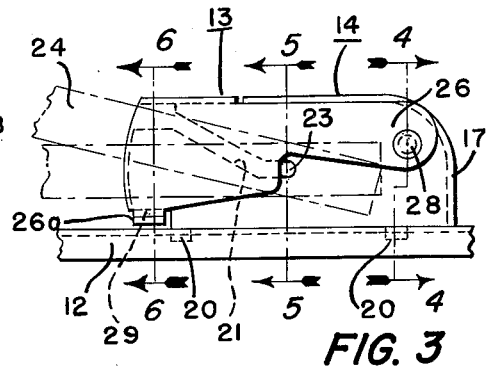
Figure 3 is a fragmentary view in elevation showing the location of the arm and blade after the connection has been effected.
Figures 4, 5, 6:
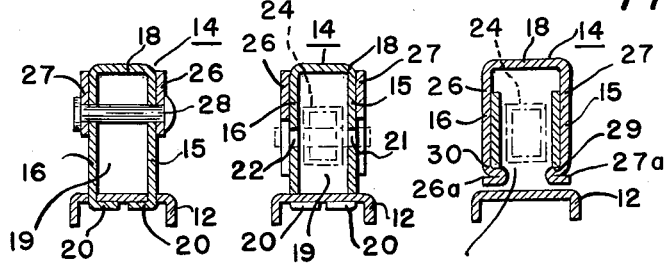

Figures 4, 5, and 6 are sectional views taken along lines 4—4, 5—5, and 6—6, respectively, of Figure 3.

Figure 1:
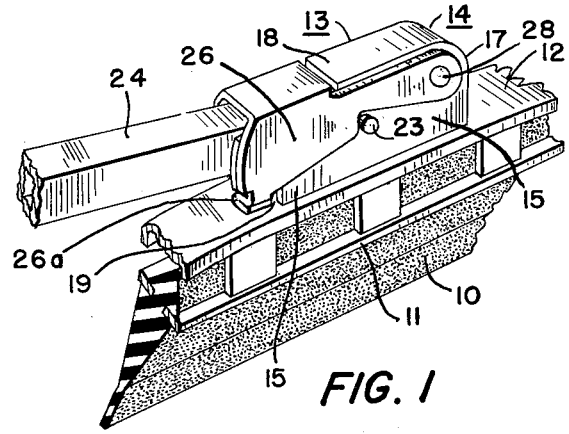
Figure 1 is a fragmentary view, partly in section, and partly in elevation, of the connector of this invention showing parts of a wiper arm and a wiper blade.

With particular reference to Figure 1, a portion of the flexible wiper blade for curved windshields is shown including a rubber wiping element 10 which is carried by a flexible backing strip 11. Pressure is imparted to the flexible wiper blade assembly from an arm through a pressure distributor linkage, which as shown, includes a holder 12. In accordance with conventional practice, the holder is pivotally connected at opposite ends to secondary pressure distributing members, not shown, which are connected to the backing strip at longitudinally spaced points. The connector of this invention is attached to the holder 12, and is designated generally by the numeral 13 in the drawings.

The connector 13 includes an inverted socket member, of channel shape, designated generally by the numeral 14, and including spaced parallel side walls 15 and 16, an end wall 17, a top wall 18, and an open front wall 19. The spaced parallel side walls 15 and 16 are formed with depending tangs 20 which extend through apertures in the primary holder 12 of the blade assembly, and are thereafter bent as shown in Figures 4 and 5 to securely connect the channel-shaped socket member 14 to the blade assembly. The spaced side walls 15 and 16 are formed with slots 21 and 22, the slots 21 and 22 having inclined portions and portions located in alignment with the primary holder 12 and having closed ends. The slots 21 and 22 are designed to receive the ends of a transversely extending pin 23 secured to the end of a rectangular arm 24 as depicted in Figures 1 and 3. Thus, the arm is inserted with the pin aligned with the slots 21 and 22 and then pushed inwardly until the pin 23 abuts the closed ends of slots 21 and 22.

Figure 2:
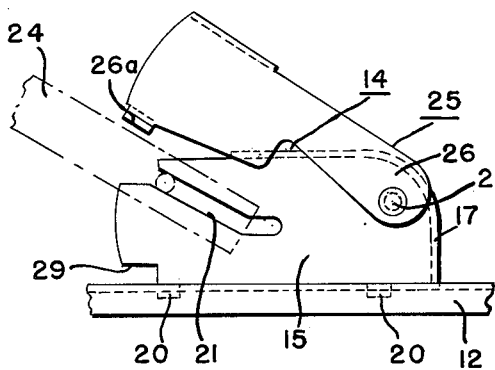
Figure 2 is a fragmentary view in elevation depicting the manner in which the arm is inserted into the connector.

The connector 13 also includes a latch member designated generally by the numeral 25. The latch member includes a bifurcated portion providing spaced arms 26 and 27 which are connected by means of a pin 28 to the socket member 14. In addition, the latch member 25 includes a channelled portion having spaced resilient ears 27a and 26a. After the arm 24 is inserted into the spaced slots 21 and 22 so that the pin 23 abuts the closed ends thereof, the latch member 25 is moved in a counterclockwise direction as viewed in Figure 2 to the position of Figure 3, at which point the spring, or resilient ears 26a and 27a will snap under the relieved portions defining edges 29 and 30 of the socket member 14. Thus, the pin 23 is securely retained and resists movement due to forces imposed on the connector during wiper operation.

From the foregoing, it is readily apparent that the present invention provides a quick detachable connector specifically designed for the use of an arm of rectangular cross section. Moreover, the connector is such that the arm is held in all directions by the combination of slots and a latch member.

While the form of embodiment of the invention as herein disclosed constitutes a preferred form, it is to be understood that other forms might be adopted, as may come within the scope of the claims which follow.

What is claimed is as follows:

1. A support, a connector carried by said support, said connector including an inverted channel member having an open end, and a latch member pivotally mounted on said channel member having a bifurcated portion and a channelled portion, said latch member detachably securing an entering part in the open end of said channel member and preventing relative tilting movement between said connector and said entering part.

2. A support, a connector carried by said support including an inverted channel member having an open end, said channel member having aligned slots in the side walls thereof and relieved portions adjacent the open end thereof, and a latch member pivotally connected to said channel member including means to completely close said slots for detachably securing an entering part in the slots thereof, said latch member preventing relative tilting movement between said connector and said entering part.

3. A support, a connector carried by said support, said connector including an inverted channel member having an open end and spaced side walls with aligned slots therein, and a latch member pivotally connected to said channel member including a channel shaped portion adapted to completely close said slots and resilient means engageable with said channel member for detachably securing an entering part in said slots, said latch member preventing relative tilting movement between said connector and said entering part.

4. A support, a connector carried by said support comprising an inverted channel member having an open end and spaced side walls with aligned slots therein, and a latch member pivotally mounted on said channel member having a bifurcated portion and a channel shaped portion, said channel shaped portion completely closing the slots in said channel member to detachably secure an entering part in the open end thereof, said latch member including means for resiliently engaging said channel member to lock the entering part therein and preventing relative tilting movement between said connector and said entering part.

References Cited in the file of this patent

UNITED STATES PATENTS

| | | |
|---|---|---|
| 449,471 | Fisher | Mar. 31, 1891 |
| 774,903 | Ammann | Nov. 15, 1904 |
| 1,136,786 | Faus | Apr. 20, 1915 |
| 1,398,547 | Graham | Nov. 29, 1921 |
| 1,557,495 | Griffin | Oct. 13, 1925 |
| 1,826,887 | Kestenman | Oct. 13, 1931 |
| 2,215,526 | Kestenman | Sept. 24, 1940 |
| 2,414,725 | Dunn | Jan. 21, 1947 |
| 2,432,693 | Anderson | Dec. 16, 1947 |
| 2,554,184 | Gerstenblith | May 22, 1951 |
| 2,616,112 | Smulski | Nov. 4, 1952 |
| 2,660,271 | Hupp | Nov. 24, 1953 |

FOREIGN PATENTS

| | | |
|---|---|---|
| 853,498 | France | Dec. 7, 1939 |